(12) United States Patent
Andersen

(10) Patent No.: US 9,159,155 B2
(45) Date of Patent: Oct. 13, 2015

(54) IMAGE RENDERING

(75) Inventor: Evan Andersen, Walnut Creek, CA (US)

(73) Assignee: Autodesk, Inc., San Rafael, CA (US)

( * ) Notice: Subject to any disclaimer, the term of this patent is extended or adjusted under 35 U.S.C. 154(b) by 964 days.

(21) Appl. No.: 12/325,772

(22) Filed: Dec. 1, 2008

(65) Prior Publication Data

US 2010/0134505 A1 Jun. 3, 2010

(51) Int. Cl.
*G09G 5/399* (2006.01)
*G06T 15/00* (2011.01)

(52) U.S. Cl.
CPC .................................. *G06T 15/005* (2013.01)

(58) Field of Classification Search
CPC . H04L 1/0071; H04L 1/1874; H03M 13/276; H03M 13/2789
USPC .................................................. 345/536, 540
See application file for complete search history.

(56) References Cited

U.S. PATENT DOCUMENTS

| | | | | |
|---|---|---|---|---|
| 6,157,751 | A | * | 12/2000 | Olson et al. ................... 382/304 |
| 2004/0223058 | A1 | * | 11/2004 | Richter et al. ............. 348/207.1 |
| 2005/0089027 | A1 | * | 4/2005 | Colton ........................... 370/380 |
| 2007/0002070 | A1 | * | 1/2007 | Hoppe et al. ................... 345/582 |
| 2009/0080719 | A1 | * | 3/2009 | Watt ............................... 382/128 |
| 2009/0169179 | A1 | * | 7/2009 | Johnson ......................... 386/124 |
| 2010/0066900 | A1 | * | 3/2010 | Lin et al. ........................ 348/441 |

OTHER PUBLICATIONS

Segovia, B. et al. Non-Interleaved Deferred Shading of Interleaved Sample Patterns. 2006.GH '06 Proceedings of the 21st ACM SIGGRAPH/EUROGRAPHICS symposium on Graphics hardware, pp. 53-60.*

Keller, A. et al. Interleaved Sampling. 2001. Proceedings of the 12th Eurographics Workshop on Rendering Techniques, pp. 269-276.*

* cited by examiner

*Primary Examiner* — Yingchun He
(74) *Attorney, Agent, or Firm* — Fish & Richardson P.C.

(57) ABSTRACT

Systems, methods, and computer program products receive an image request identifying an image having a width and a height. A number of interleaved buffers is identified, each of the interleaved buffers operable to store data associated with the image. The image is split into each of the interleaved buffers on a computing device. An interleaved image is displayed corresponding to at least one of the interleaved buffers, where the interleaved image having substantially the same width and height of the image.

27 Claims, 4 Drawing Sheets

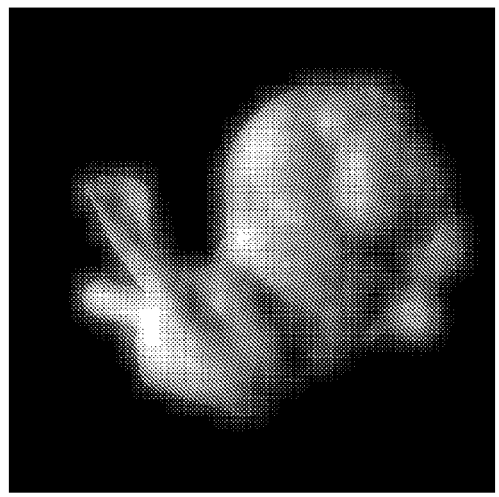
FIG. 5A
502
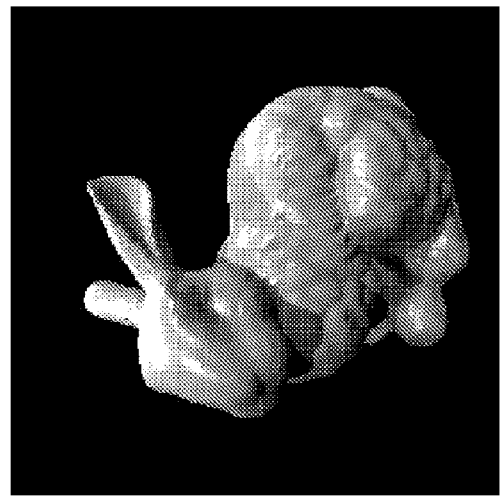
FIG. 5B
504
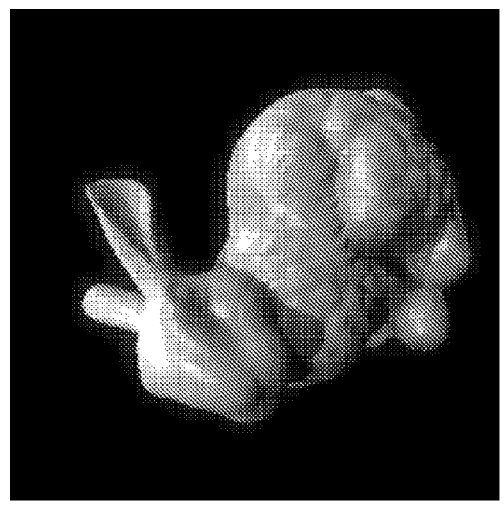
FIG. 5C
506
FIG. 5D
508
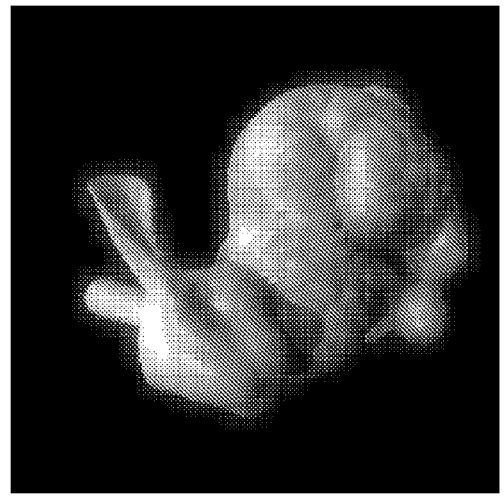
FIG. 5E
510

IMAGE RENDERING

BACKGROUND

The present disclosure relates to systems, methods, and computer program products for image rendering.

In rendering images for viewing on a computer display, there has always been a trade-off between rendering quality and speed. Better quality rendering typically takes more computing power and CPU time. In order to speed up a rendering, generally there are sacrifices that must be made in the quality. An example of a high quality rendering might be a photo-realistic image, while lower quality, fast rendering might be used for interactivity with an image.

Conventional attempts to render a high quality image, such as ray tracing image, can take a substantial amount of time to fully render include splitting an image into tiles. As a result, a conventional approach to rendering such an image is by rendering only portions, such as tiles, of the image at a time. This requires a user to wait for a portion of the image to be rendered, after which the user can view only the tile or portion of the image rather than the entire image.

SUMMARY

This specification describes technologies relating to image rendering. In particular, systems, methods, and computer program products allow high quality, photo-realistic rendering to progressively blend with a much faster, low visual quality environment allowing interactivity and progressive quality.

In general, one aspect of the subject matter described in this specification can be embodied in a method including receiving an image request identifying an image having a width and a height, and identifying a number of interleaved buffers, each of the interleaved buffers operable to store data associated with the image. The method further includes splitting the image into each of the interleaved buffers on a computing device, and displaying an interleaved image corresponding to at least one of the interleaved buffers, the interleaved image having substantially the same width and height of the image.

According to a feature, displaying further includes iteratively displaying interleaved images corresponding to two or more of the interleaved buffers. According to another feature, the method can include blending the interleaved image with at least one other interleaved image corresponding to an interleaved buffer. According to yet another feature, the method can include displaying the blended image.

In another feature, the interleaved image includes the image for display. The number of interleaved buffers can also be identified based on a size of the image, or based on a user input. According to another feature, a blur filter is applied is the interleaved image prior to displaying the interleaved image. According to still another feature, splitting the image into each of the interleaved buffers includes splitting the image into each of the interleaved buffers using sampling.

Displaying an interleaved image can include displaying an interleaved image corresponding to at least one of the interleaved buffers, the interleaved image having the width and the height of the received image. According to a feature, the method can include rendering the interleaved image corresponding to the at least one of the interleaved buffers using ray tracing. A camera angle may be employed to render the interleaved image corresponding to the at least one of the interleaved buffers. The camera angle may be adjusted by offsetting the same angle prior to rendering at least one other interleaved image corresponding to an interleaved buffer.

Other embodiments of the above aspects include corresponding systems, apparatus, and computer program products.

Particular implementations of the subject matter described in this specification can realize one or more of the following advantages. Using the techniques described herein users can quickly view a lower-resolution view of an entire image. Once each of the remaining buffers is rendered, they are blended into the image to provide the full detail of an image.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

FIGS. 5a-5e show example images rendered using two or more interleaved buffers.

Like reference numbers and designations in the various drawings indicate like elements.

DETAILED DESCRIPTION

Implementations described herein split an image to be rendered into interleaved buffers. The buffers are small, in comparison to a conventional single buffer used for rendering, by a proportional amount based on the degree to which the image is split. For instance, four buffers may be used instead of a single frame buffer to split an image into four images, where each interleaved buffer is one quarter the size (e.g., in pixels) of the single frame buffer. The total number of pixels rendered remains constant, but each interleaved buffer is separately rendered and viewable.

Because each interleaved buffer is not simply a tile (i.e., a portion of the image), but represents the whole view of an image to be rendered, the image is displayed immediately. Using interleaved buffers users can quickly view a lower-resolution view of an entire image while the other interleaved buffers are still being rendered. Once each of the remaining buffers is rendered, they are blended into the image to provide the full detail of an image.

Additionally, because each interleaved buffer is separately rendered, some can be rendered using fast techniques while others can be rendered more slowly with higher quality results. The combination of blended images from respective buffers permits the image to be rendered with a dynamic mixture of speed and quality. For instance, all interleaved buffers may be assigned fast status, complete their render and interleave steps, and then can be individually switched to higher quality and contribute their new results to the image.

Yet another advantage is that without increasing the number of pixels (or samples), interleaving at non-regular grid offsets provides anti-aliasing. In addition to blending speed and quality, sketches (e.g., CAD sketches) or any other effects added to the image (e.g., highlighting) can be blended.

A. Computing Device for Image Rendering

Figure 1:
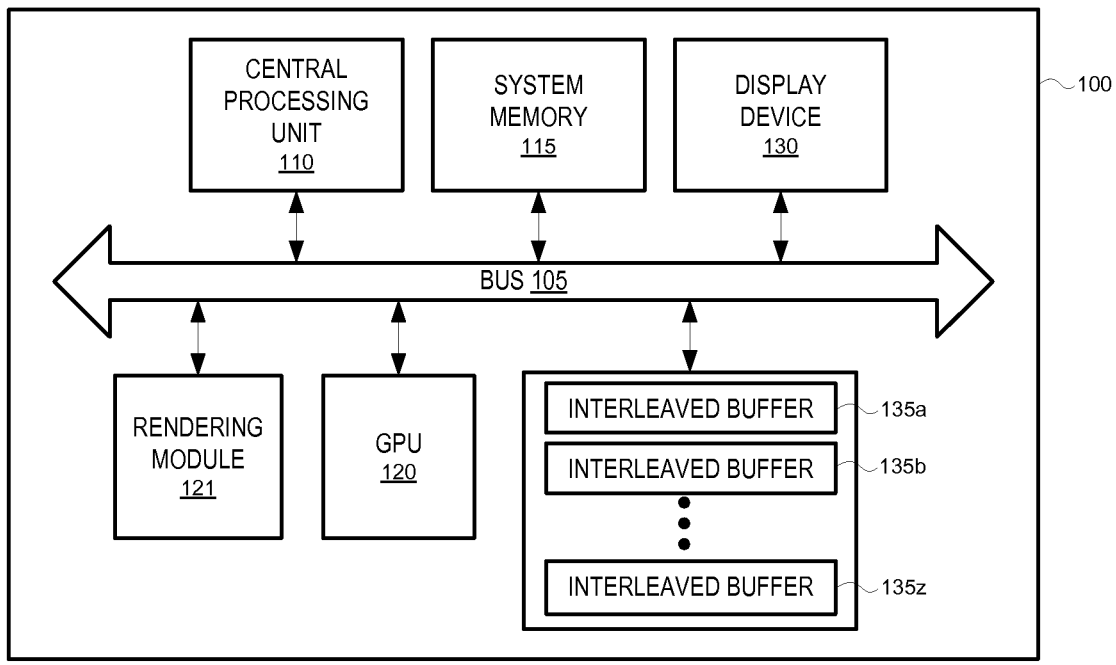
FIG. 1 shows an example computing device for image rendering.

FIG. 1 shows an example computing device 100 for image rendering. The computing device 100 includes a central processing unit (CPU) 110, a system memory 115, a graphics processing unit (GPU) 120, rendering module 121, interleaved buffers 135, and a display device 130, each of which may communicate with each other via a bus 105. The CPU 110 may be a processor that executes computer executable programs with the aid of an operating system (not illustrated). The system memory 115 is operable to store data created or received by the computing device 110, and can include ROM, RAM, optical media, or other storage, as are well known in the art.

The rendering module 121 processes graphics data and render an image that can include one or more effects, such as shading, reflections, line-drawings, etc. In some implementations the GPU 120 includes the necessary hardware and/or software to permit the rendering module 121 to process graphics data and render an image. In other implementations the CPU includes the necessary hardware and/or software to permit the rendering module 121 to process graphics data and render an image. The interleaved buffers 135 store data processed by the GPU 120 and/or CPU 110. When an interleaved buffer 135 is full, the contents of that interleaved buffer 135 may be output to the display device 130 for display to a user. As explained below, the interleaved buffers 135 can iteratively render images on the display device 130, such that low quality images are quickly rendered from one or more interleaved buffers and then subsequently replaced by higher quality images from the same or other buffers. Although many interleaved buffers 135 can be included in the computing device 100, the device 100 may operate with as few as two. Typically, the display device 130 is a CRT or LCD display.

Persons skilled in the art will recognize that any system having one or more processing units configured to implement the teachings disclosed herein falls within the scope of the present invention. For example, the computing device 100 may be, for instance, a desk-top computer, a laptop computer, a mobile device, a personal digital assistant device, or the like.

Although not shown in FIG. 1, one or more of the components of the computing device 100 can be distributed across two or more computing devices, such as distributed across one or more networks (e.g., a LAN, WAN, the Internet, or a combination thereof). As an example, the display device 130 can reside on a client computer and the GPU 120 and/or CPU 110 can reside in a server computer in a client-server system. Additionally, one or more of the components may be distributed and/or combined with other components.

It should be appreciated that the components described herein with respect to FIG. 1 may include computer-executable software running in conjunction with computer hardware. For instance, as illustrated in FIG. 1, and as described in detail below, the rendering module 121 can include computer executable programs (i.e., software) stored within one or more memories of the computing device 100 that are executed by the GPU 120 and/or CPU 110 to effect the functions described in detail herein. In some implementations the rendering module 121 may be implemented by an application-specific integrated circuit (ASIC), firmware, dedicated components, or the like, as are known in the art. Thus, it will be appreciated that the computing device 100 may be implemented in an entirely hardware embodiment, an embodiment combining software and hardware, or an embodiment comprised entirely of hardware.

B. Pixel Interleaving and Camera Parameters

Figure 2:
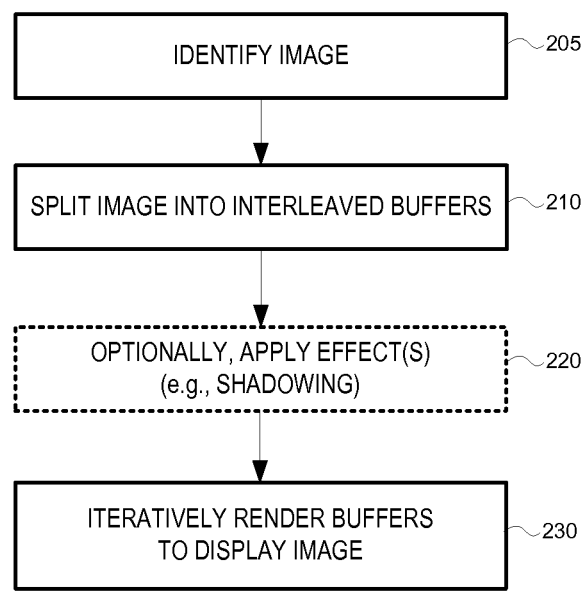
FIG. 2 shows an example high level process for rendering an image using two or more interleaved buffers.

FIG. 2 shows an example high level process 200 for rendering an image using interleaved buffers. An image is identified 205, for instance, by the CPU 110 and/or GPU 120. For instance, the image may be received at the CPU 110 and/or GPU 120 from the system memory 115 via the bus 105. The rendering module 121 then splits the image into two or more interleaved buffers 210.

In some implementations the buffers are sized, in comparison to a full size frame buffer that typically handles a full image, smaller and proportional to the amount the image is split up because the bytes in each interleaved buffer are not repeated in other buffers. Thus, the size of each interleaved buffer are a fraction of the size of a typical display buffer. For instance, if an image has a width of 640, height of 480, and a 24 bit color depth, a single buffer size would need to be 640*480*24 bytes, or 921,600 bytes. If four interleaved buffers are used, the buffers would each account for $\frac{1}{4}^{th}$ of the single buffer, so each would be required to be 921,600/4 bytes, or 230,400 bytes.

According to some implementations, the number of interleaved buffers may be determined by the rendering module 121 based on the size of the image to be rendered. For instance, the rendering engine may select a number of interleaved buffers such that no single interleaved buffer has more than a certain number of bytes. In some implementations the determination of the number of interleaved buffers may be done automatically by the rendering module 121. In other implementations the number of buffers may be programmed by a user via one or more graphical user interfaces that permit the user to control settings of the rendering module 121.

The use of a smaller interleaved buffers permits faster rendering on the display device 130. Because images are divided up evenly, in some implementations when more buffers are desired, the number of buffers are increased in number by a power of 4. According to some implementations, 4 or 16 buffers are desirable, though a greater or fewer number may also be used. According to some implementations, to identify how an image to be rendered is split up, the resolution of an image is divided by the total number of buffers. For instance, a 640×480 image can be divided into 4 buffers each having 320×240 resolution. Unlike conventional techniques, the 320×240 resolution images are not tiled, but they overlap and thus represent pixels over the entire area of the fully rendered image, but at lower resolution.

After the image is split into interleaved buffers, optionally, on or more effects are applied. The effects can be applied by one or more interleaved buffers in the same manner as the original image. For instance, features such as shadowing, sketches (e.g., CAD sketches) and the like can be applied using respective interleaved buffers. The interleaved buffers are then iteratively rendered to display the image 230. This may be performed, for instance, by the rendering module 121. Prior to displaying the image, one or more additional effects can be applied, such as a small blur filter (e.g., blurring using a 3×3 block surrounding a pixel). The blur filter may be applied to an image rendered from an interleaved buffer.

In some implementations ray tracing is used to render an image. In such implementations a set of camera parameters may be used to control the location of a pixel grid representing samples of the original image, where the pixel grid defines the pixels included in each interleaved buffer. The position of the camera is changed slightly to produce the sample pixels in each interleaved buffer. To the naked eye, the rendering of each interleaved buffer may appear similar for the same resolution sample, even if each is generated with a slightly different camera offset.

According to some implementations the camera parameters can be supplied by an application developer using the CPU 110 and/or GPU 120. According to other implementations the camera parameters can be supplied by an application developer using a graphics application, which may or may not be stored and operating in the computing device 110 of FIG. 1. A graphics application may include calls to a graphics application programming interface (API). Well-known graphics API's include the OpenGL® and Direct3D® APIs, however, no particular graphics API is required to effect the processes described herein. In some implementations a graphics API can provide a collection of function calls and data structures to a graphics application used to draw and manipulate complex two-dimensional or three-dimensional scenes from simple primitives. One or more drivers or hardware can also implement functions and data structures defined by graphics.

Figure 3A:
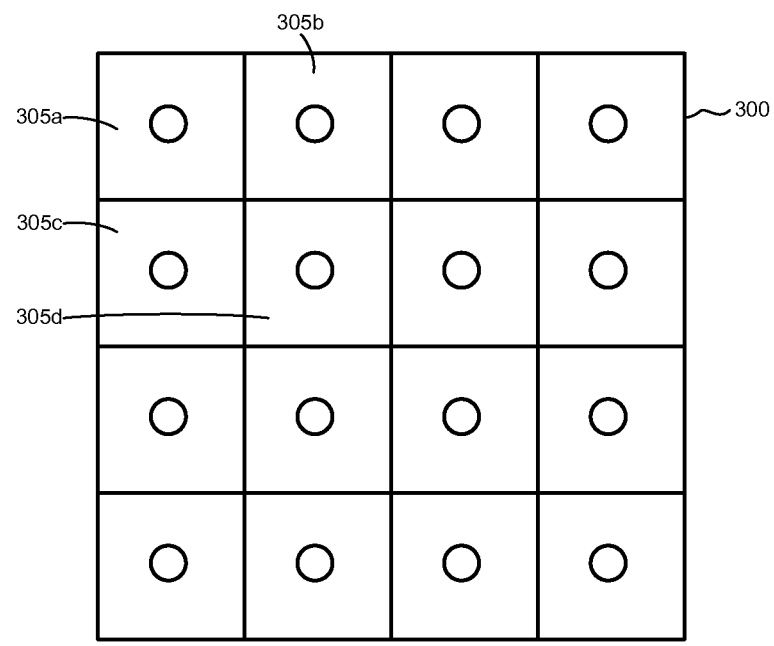
FIGS. 3a and 3b shows an example of an image pixel grid and a sampled pixel grid, respectively.
Figure 3B:
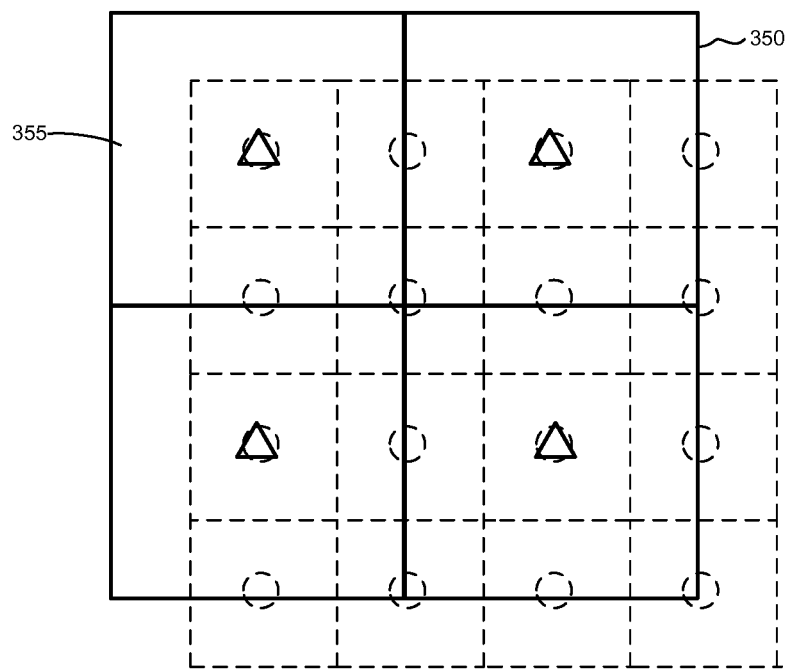

FIGS. 3a and 3b show examples of an image pixel grid and a sampled pixel grid, respectively. In particular, the pixel grid 300 of FIG. 3a is a 4×4 grid of pixels of an image to be rendered, for instance, by the computing device 100. The pixels in the pixel grid 300 can be represented using (x, y, z) coordinates and (r, g, b, a) color values. Generally, the locations of the pixels within grid 300 can map to locations within a scene being generated by a graphics application. As stated, a set of camera parameters may be used to alter the location of pixel grid 300 from its original position to define a sample grid. The amount of translation, rotation, scaling, and/or skewing used to relocate pixel grid 300 from its original position may be designated by the graphics developer via a graphics application or the like.

FIG. 3b is a conceptual illustration of a sample pixel grid 350 having a lower resolution (i.e., fewer pixels) and having been shifted by a camera offset to sample the image grid 300 of FIG. 3a. The sample pixel grid 350 represents, for instance, pixels stored in an interleaved buffer of the computing device 110.

Illustratively, the pixel grid 350 is a 2×2 grid that is translated down and to the right (in terms of x,y coordinates) relative to the position of the pixel grid 300 shown FIG. 3a. In one embodiment, the set camera parameters specify the grid resolution. As shown in FIG. 3b, pixel 355 represents four pixels 305a-305d in the pixel grid 300 of FIG. 3a. The pixel 355 therefore represents a sample of the portion of the image represented by the four pixels 305a-305. Therefore, the pixel grid 350 represents one-quarter (¼) the resolution of the pixel grid 300 of FIG. 3a.

In the sample pixel grid 350, the center of the sample pixels corresponds to the center of ¼ of the pixels in the pixel grid 300, specifically, those pixels in the upper left-hand corner of a four pixel grouping. As described below, a camera offset is implemented for each respective buffer. Offsetting the camera results in the center of the sample pixels corresponding to the center of other pixels in the pixel grid 300. For instance, a camera offset for a subsequent interleaved buffer may result in the center of the sample pixels corresponding to the center of ¼ other pixels (e.g., pixels in the upper right-hand corner of a four pixel grouping) in the pixel grid 300. Once the sample data is collected for each of the interleaved buffers, the images corresponding to each interleaved buffer can be combined, or blended, to reproduce the image.

In some implementations, the formula for determining the camera offset to generate respective interleaved buffers depends on the number of interleaved buffers. For a the interleaved buffer number "frameNumber" out of a total number of buffers, "totalFrames", the camera offset may be calculated as:

$$X = -\frac{1}{2} + \frac{1}{2*\sqrt{(totalFrames)}} + \frac{frameNumber\%\sqrt{(totalFrames)}}{\sqrt{(totalFrames)}}$$

$$Y = \frac{1}{2} - \frac{1}{2*\sqrt{(totalFrames)}} - \frac{frameNumber/\sqrt{(totalFrames)}}{\sqrt{(totalFrames)}}$$

As an example, if the total number of buffers is 4, the first buffer has a frameNumber of 0, which results in a camera offset of X=−0.25 and Y=0.25. For the second buffer, with a frameNumber of 1, the camera offset is X=0.25, Y=0.25; for the third buffer, with a frameNumber of 2, the camera offset is X=−0.25, Y=−0.25; and for the fourth buffer, with a frameNumber of 3, the camera offset is X=0.25, Y=−0.25.

Splitting the image into the interleaved buffers permits a ray traced image to be represented progressively. This use of multiple interleaved buffers therefore permits the blending of images using a series of rendered images corresponding to each interleaved buffer.

As described above, some of the interleaved buffers may be used to render an image quickly by sampling the image, such as using the techniques described above. According to some implementations, after rendering a low-quality sample of an image, one or more of the interleaved buffers can be switched to a higher quality and then contribute the new results to the image. For instance, a buffer can first include data representing a lower quality representation of an image, and after rendering, can be switched to include data representing a higher quality version of the image. This may require a lower sampling rate and greater buffer capacity. According to some implementations 4 buffers can be used, which each store low quality representations of an image, where each is switched to a higher quality as each completes the low quality rendering and becomes available. The low quality buffers can also be switched at random with higher quality samples to hide interleaving of the buffers from a user.

To hide the interleaving and improve the visual quality, a small blur filter (3×3 pixels) can be applied before the user sees the image. It will also be appreciated that sample images may be interleaved at non-regular offsets, which may result in anti-aliasing. Additionally, it will be appreciated that in addition to blending low and high quality images, one or more interleaved buffers can be used to blend in effects such as sketches (e.g., CAD sketched), shadowing, or the like. In some implementations, processes that are much for intensive to compute can be added subsequent to processes that are less intensive to compute. For instance, in ray tracing implementations, rendering using direct lighting can occur first, after which shadows and then indirect lighting or "global illumination" processes follow.

Figure 4A:
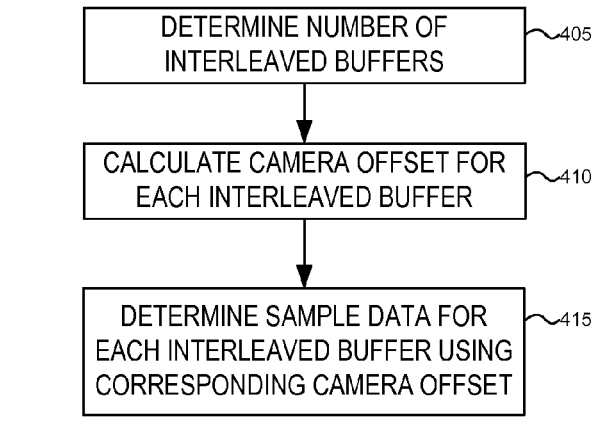
FIG. 4a shows an example process of splitting an image into interleaved buffers.

FIG. 4a shows an example process 400 of splitting an image into interleaved buffers. The process begins after an image is identified 205, as described above with respect to FIG. 2. First, the number of interleaved buffers into which the image will be split is determined 405. For instance, the number of interleaved buffers may be determined by the rendering module 121 (e.g., based on the size of the image to be rendered), or alternatively may be selected by a user via one or more graphical user interfaces.

Next, for each interleaved buffer a camera offset is calculated 410. This calculation can occur, for instance, by the rendering module 121. Sample data is taken for each interleaved buffer using its corresponding camera offset 415. This data can be determined by the rendering module, and the sample data is stored in a respective interleaved buffer.

Figure 4B:
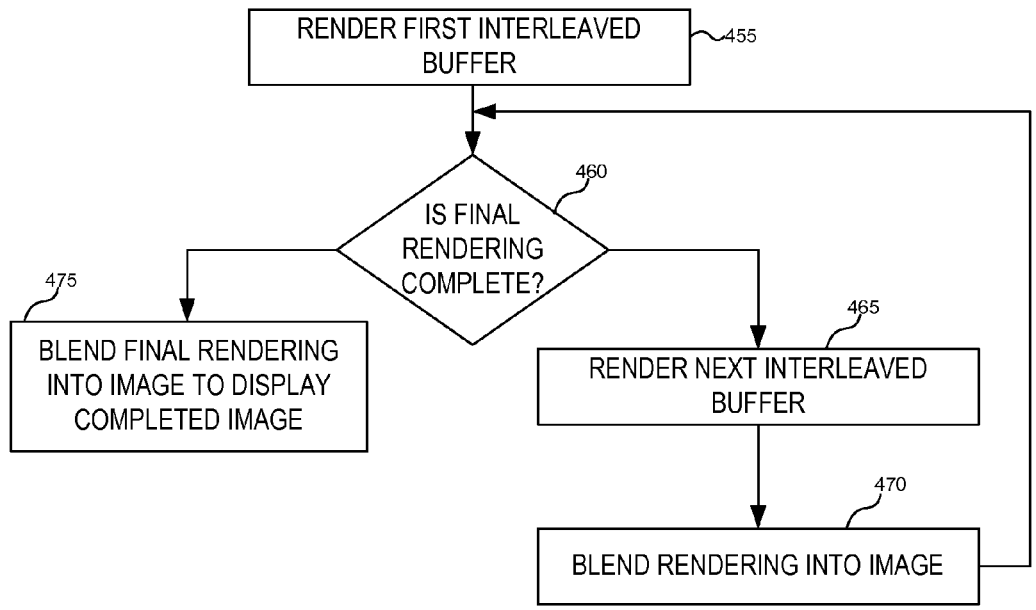
FIG. 4b shows an example process of iteratively rendering buffers to display an image.

FIG. 4b shows an example process 450 of iteratively rendering buffers to display an image. First, a first interleaved buffer is rendered 455, for instance, by the rendering module 121. The rendered image is viewable on the display device 130 by a user. While rendering is not complete 460, the next interleaved buffer is rendered 465 and the sample data is blended into the previous image 470. This process continues iteratively until the final rendering is blended into the image to display the completed image 475. According to some implementations, this iterative process is executed by the rendering module 121. In some implementations each of the interleaved buffers are rendered immediately after they are filled with sample data so that images are displayed quickly to a user.

FIGS. 5a-5e show example images 502, 504, 506, 508, 510 rendered using interleaved buffers. As can be seen, the first image 502 is at low quality, which can represent, for instance, the image generated by an interleaved buffer after a small blur filter is applied to the image. The second image 504 represents an image generated from an interleaved buffer and blended into the first image 502. The blending can be implemented, for instance, by the rendering module 121. The third image 506 also shows a blended image generated from an image generated from another interleaved buffer and blended into (i.e., added to) the second image 504. The fourth image 508 represents a rendering after a third image is blended into the image 506 of FIG. 5c. Finally, the fifth image 510 represents a rendering after a fourth image is blended into the image 508 of FIG. 5d.

Each of the example images 502, 504, 506, 508, 510 can represent a sequence of images rendered for display to a user. Therefore, the user will view a full frame of the image, albeit at a lower resolution (as shown, for instance, in FIG. 5a) immediately. That image 502 will be replaced, consecutively, by the images 504, 506, 508, 510 shown in FIGS. 5b-5e. It will be appreciated that blending is the result of interleaving two or more interleaved images, where each interleaved image contributes a portion of the pixels comprising the original image to be rendered. For instance, two interleaved images may respectively contribute one-quarter of the total number of pixels of an image, such that the two interleaved images with contribute half of the total number of pixels of the image when they are blended (or added) together.

Embodiments of the subject matter and the functional operations described in this specification can be implemented in digital electronic circuitry, or in computer application, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single application product or packaged into multiple application products.

Thus, particular embodiments of the invention have been described. Other embodiments are within the scope of the following claims. For example, the actions recited in the claims can be performed in a different order and still achieve desirable results.

The invention claimed is:

1. A method performed by a system of one or more computers, the method comprising:
   receiving an image request identifying an image having a width and a height and being at a first resolution;
   identifying a plurality of interleaved buffers, each of the interleaved buffers operable to store data associated with the image and representing a whole view of the image, wherein the whole view includes a full frame of the image at a second resolution that is different from and less than the first resolution;
   determining a respective camera offset angle for each interleaved buffer based at least in part on a total number of interleaved buffers of the plurality of interleaved buffers;
   splitting the image into each of the interleaved buffers using different sampling rates for two or more of the interleaved buffers, including, for each interleaved buffer, sampling the image using the determined respective camera offset angle for a respective interleaved buffer;
   rendering a first representation of the image based on the contents of a first interleaved buffer using the respective offset camera angle for the first interleaved buffer;
   displaying the first representation of the image;
   after displaying the first representation and while the first representation is still being displayed, rendering a second representation of the image based on the contents of a second interleaved buffer using the respective offset camera angle for the second interleaved buffer;
   blending the second representation of the image with the first representation of the image to create an interleaved image; and
   displaying the interleaved image in place of the first representation of the image.

2. The method of claim 1, further comprising iteratively displaying interleaved images corresponding to two or more of the interleaved buffers.

3. The method of claim 1, wherein identifying the plurality of interleaved buffers further comprises determining a number of interleaved buffers based on a size of the image.

4. The method of claim 1, wherein identifying the plurality of interleaved buffers further comprises determining a number of interleaved buffers based on a user input.

5. The method of claim 1, further comprising applying a blur filter to the interleaved image prior to displaying the interleaved image.

6. The method of claim 1, wherein the first image and the second image have a number of pixels, and wherein blending the second representation of the image with the first representation of the image results in the interleaved image having twice the number of pixels.

7. The method of claim 1, wherein the interleaved image has the width and the height of the image.

8. The method of claim 1, wherein rendering the first representation of the image comprises performing ray tracing.

9. The method of claim 1 wherein the number of interleaved buffers is two or more and wherein data from a interleaved buffer is provided to a frame buffer to enable display to the user and wherein each of the interleaved buffers is initially rendered using a first technique to produce a faster but lower quality rendering of contents of a respective interleaved buffer and after an the initial rendering are re-rendered using a second different technique to produce a slower but higher quality rendering of the contents of the respective interleaved buffers and wherein upon re-rendering of a given respective interleaved buffer results are blended with a then presented image that is included in the frame buffer.

10. A computer program product, encoded on a computer-readable storage device, operable to cause data processing apparatus to perform operations comprising:
   receiving an image request identifying an image having a width and a height and being at a first resolution;
   identifying a plurality of interleaved buffers, each of the interleaved buffers operable to store data associated with the image and representing a whole view of the image, wherein the whole view includes a full frame of the image at a second resolution that is different from and less than the first resolution;
   determining a respective camera offset angle for each interleaved buffer based at least in part on a total number of interleaved buffers of the plurality of interleaved buffers;
   splitting the image into each of the interleaved buffers using different sampling rates for two or more of the interleaved buffers, including, for each interleaved buffer, sampling the image using the determined respective camera offset angle for a respective interleaved buffer;

rendering a first representation of the image based on contents of a first interleaved buffer using the respective offset camera angle for the first interleaved buffer;

displaying the first representation of the image;

after displaying the first representation and while the first representation is still being displayed, rendering a second representation of the image based on the contents of a second interleaved buffer using the respective offset camera angle for the second interleaved buffer;

blending the second representation of the image with the first representation of the image to create an interleaved image; and displaying the interleaved image in place of the first representation of the image.

11. The computer program product of claim 10, the operations further comprising iteratively displaying interleaved images corresponding to two or more of the interleaved buffers.

12. The computer program product of claim 10, wherein identifying the plurality of interleaved buffers further comprises determining a number of interleaved buffers based on a size of the image.

13. The computer program product of claim 10, wherein identifying the plurality of interleaved buffers further comprises determining a number of interleaved buffers based on a user input.

14. The computer program product of claim 10, further operable to cause data processing apparatus to perform operations comprising: applying a blur filter to the interleaved image prior to displaying the interleaved image.

15. The computer program product of claim 10, wherein the first representation of the image and the second representation of the image have a number of pixels, and wherein blending the second representation of the image with the first representation of the image results in the interleaved image having twice the number of pixels.

16. The computer program product of claim 10, wherein the interleaved image has the width and the height of the image.

17. The computer program product of claim 10, wherein rendering the first representation of the image comprises performing ray tracing.

18. The computer program product of claim 10 wherein the number of interleaved buffers is two or more and wherein data from a interleaved buffer is provided to a frame buffer to enable display to the user and wherein each of the interleaved buffers is initially rendered using a first technique to produce a faster but lower quality rendering of contents of a respective interleaved buffer and after an the initial rendering are re-rendered using a second different technique to produce a slower but higher quality rendering of the contents of the respective interleaved buffers and wherein upon re-rendering of a given respective interleaved buffer results are blended with a then presented image that is included in the frame buffer.

19. A system of one or more computers configured to perform operations comprising:

receiving an image request identifying an image having a width and a height and being at a first resolution;

identifying a plurality of interleaved buffers, each of the interleaved buffers operable to store data associated with the image and representing a whole view of the image, wherein the whole view includes a full frame of the image at a second resolution that is different from and less than the first resolution;

determining a respective camera offset angle for each interleaved buffer based at least in part on a total number of interleaved buffers of the plurality of interleaved buffers;

splitting the image into each of the interleaved buffers using different sampling rates for two or more of the interleaved buffers, including, for each interleaved buffer, sampling the image using the determined respective camera offset angle for a respective interleaved buffer;

rendering a first representation of the image based on contents of a first interleaved buffer using the respective offset camera angle for the first interleaved buffer;

displaying the first image;

after displaying the first representation and while the first representation is still being displayed, rendering a second representation of the image based on contents of a second interleaved buffer using the respective offset camera angle for the second interleaved buffer;

blending the second representation of the image with the first representation of the image to create an interleaved image; and displaying the interleaved image in place of the first representation of the image.

20. The system of claim 19, the operations further comprising iteratively displaying interleaved images corresponding to two or more of the interleaved buffers.

21. The system of claim 19, wherein identifying the plurality of interleaved buffers further comprises determining a number of interleaved buffers based on a size of the image.

22. The system of claim 19, wherein identifying the plurality of interleaved buffers further comprises determining a number of interleaved buffers based on a user input.

23. The system of claim 19, the operations further comprising applying a blur filter to the interleaved image prior to displaying the interleaved image.

24. The system of claim 19, wherein the first representation of the image and the second representation of the image have a number of pixels, and wherein blending the second representation of the image with the first representation of the image results in the interleaved image having twice the number of pixels.

25. The system of claim 19, wherein the interleaved image has the width and the height of the image.

26. The system of claim 19, wherein rendering the first representation of the image comprises performing ray tracing.

27. The system of claim 19 wherein the number of interleaved buffers is two or more and wherein data from a interleaved buffer is provided to a frame buffer to enable display to the user and wherein each of the interleaved buffers is initially rendered using a first technique to produce a faster but lower quality rendering of contents of a respective interleaved buffer and after an the initial rendering are re-rendered using a second different technique to produce a slower but higher quality rendering of the contents of the respective interleaved buffers and wherein upon re-rendering of a given respective interleaved buffer results are blended with a then presented image that is included in the frame buffer.

* * * * *

UNITED STATES PATENT AND TRADEMARK OFFICE
CERTIFICATE OF CORRECTION

PATENT NO. : 9,159,155 B2
APPLICATION NO. : 12/325772
DATED : October 13, 2015
INVENTOR(S) : Evan Andersen Page 1 of 1

It is certified that error appears in the above-identified patent and that said Letters Patent is hereby corrected as shown below:

Claims

Column 10, line 45, claim 9: delete "after an the initial" and insert --after an initial-- therefor.

Column 11, line 52, claim 18: delete "after an the initial" and insert --after an initial-- therefor.

Column 12, line 59, claim 27: delete "after an the initial" and insert --after an initial-- therefor.

Signed and Sealed this
Twenty-third Day of February, 2016

Michelle K. Lee
*Director of the United States Patent and Trademark Office*